(No Model.)
T. SEWELL.
FISHING LINE SINKER.
No. 549,332. Patented Nov. 5, 1895.
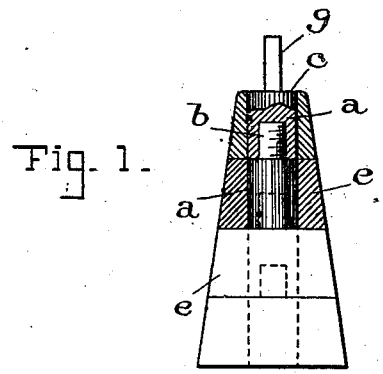
Fig. 1.
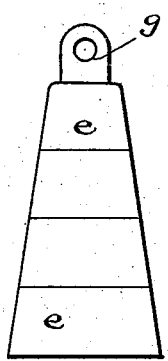
Fig. 2.
Fig. 3.
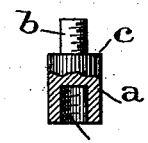
Fig. 4.
Fig. 5.
WITNESSES:— L. J. Van Horn. Charles B. Mann Jr.
INVENTOR:— Thomas Sewell
By Chas. B. Mann
ATTORNEY.

UNITED STATES PATENT OFFICE.

THOMAS SEWELL, OF BALTIMORE, MARYLAND.

FISHING-LINE SINKER.

SPECIFICATION forming part of Letters Patent No. 549,332, dated November 5, 1895.

Application filed July 27, 1895. Serial No. 557,330. (No model.)

*To all whom it may concern:*

Be it known that I, THOMAS SEWELL, a citizen of the United States, residing at Baltimore, in the State of Maryland, have invented certain new and useful Improvements in Sinkers for Fishing-Lines, of which the following is a specification.

This invention relates to an improved sinker for fishing-lines, which will first be described, and then pointed out in the claim.

The invention is illustrated in the accompanying drawings, in which—

Figure 1 is an elevation, being partly a side view and partly a section, of the sinker. Fig. 2 is a side view of the sinker. Fig. 3 is a view of one of the hard-metal cores with which each section is provided. Fig. 4 is a view of one of the sections of the sinker having the form of a frustum of a cone. Fig. 5 shows the sinker attached to a fishing-line.

The object of the invention is to provide a simple and convenient construction of sinker for deep-water fishing, whereby the weight of the sinker may be readily increased or diminished to suit the various conditions incident to changes in the tide and varying depths of water.

The sinker comprises a plural number of sections, each being provided with its own screw-stem and screw-socket. The letter $a$ designates a core or center piece of comparatively hard metal, preferably brass This core has at one end a screw-stem $b$, with a shoulder $c$, and at the other a screw-threaded socket $d$. A mass or body $e$ of lead is molded or cast around the core, so that the top face $f$ of said body is flush with the shoulder $c$, and said core and lead body constitute one section of the sinker.

The several sections of the sinker have the form of a frustum of a cone, and thus while all the sections have the same uniform height each section has a different weight from the others. One of the lighter sections or the heaviest one may be directly attached to the upper section, and when all are connected together, as in Fig. 2, the sinker is tapering or conical shaped the top end having an eye and the base being flat. The upper section differs from the other sections in having no screw-stem, but has instead an eye $g$ for the attachment to the end of a line $h$. The core of the upper section has the screw-threaded socket $d$, and integral with the core at its top end is the eye $g$. The line $h$ may have one or more hooks $i$, each attached to a short branch line $j$, which is secured to the main line. In shallow water and little or no current one section alone of the sinker may be sufficient to hold the line steady. In deeper water and with a little current two sections may be needed, or three, or even four, according to the conditions.

The manner of fishing with this sinker is indicated in Fig. 5. The fisherman uses no rod, but holds the line $h$ in his hand, so as to permit the sinker to touch the bottom or bed below the water. By this manner of operating, the fishing-line $h$ is kept gently or moderately taut, and any nibble or bite of a fish is readily felt. If the fisherman finds it necessary to increase or diminish the weight of the sinker he can readily do so by simply adding to the lower section one or more sections or by removing said lower section.

Having thus described my invention, what I claim as new, and desire to secure by Letters Patent, is—

A sectional sinker for fishing lines, comprising an upper section having a body of lead and a hard metal core provided at one end with a projecting eye for attachment of the line and at the other end with a screw-threaded socket; a lower section having a body of lead with a flat bottom end and a hard metal core with a screw-stem projecting from the top end and from a shoulder, $c$, which is flush with the top face of the lead body; and intermediate sections each having the shape of a frustum of a cone and each being of a different weight from the other, and each section provided with a core having a screw-stem projecting from the top end and from a shoulder, $c$, which is flush with the top face of the section and a screw-threaded socket at the other end, all the said sections when connected forming a conical-shaped sinker, substantially as described.

In testimony whereof I affix my signature in the presence of two witnesses.

THOMAS SEWELL.

Witnesses:
 CHARLES B. MANN, Jr.,
 C. CALVERT HINES.